United States Patent [19]

Jung

[11] 4,217,596

[45] Aug. 12, 1980

[54] RECORDING CARRIER FOR ELECTRICAL DISCHARGE RECORDING APPARATUS

[75] Inventor: Werner Jung, Waiblingen, Fed. Rep. of Germany

[73] Assignee: Robert Bosch GmbH, Stuttgart, Fed. Rep. of Germany

[21] Appl. No.: 954,637

[22] Filed: Oct. 25, 1978

[30] Foreign Application Priority Data

Oct. 27, 1977 [DE] Fed. Rep. of Germany ....... 2748161

[51] Int. Cl.2 ........................................ G01D 15/24

[52] U.S. Cl. ........................................ 346/135.1

[58] Field of Search ........................................ 346/135

[56] References Cited

U.S. PATENT DOCUMENTS

| | | | |
|---|---|---|---|
| 3,772,159 | 11/1973 | Sakata et al. | 346/135 X |
| 3,786,518 | 1/1974 | Atherton | 346/135 |
| 3,831,179 | 8/1974 | Brill et al. | 346/135 X |
| 3,861,952 | 1/1975 | Tokumoto et al. | 346/135 X |
| 3,905,876 | 9/1975 | Yoshino et al. | 346/135 X |
| 3,936,361 | 2/1976 | Takatori et al. | 346/135 X |
| 3,995,083 | 11/1976 | Reichle | 346/135 X |
| 4,024,546 | 5/1977 | Brill et al. | 346/135 |
| 4,133,933 | 1/1979 | Sekine et al. | 346/135 X |

*Primary Examiner*—George H. Miller, Jr.

*Attorney, Agent, or Firm*—Frishauf, Holtz, Goodman & Woodward

[57] ABSTRACT

The recording carrier is metallized, typically with aluminum. Between the aluminum and the paper is an intermediate layer made of lacquer or printing ink, or both. The aluminum coating has a metallically shiny surface which reduces contrast. To increase contrast upon recording by burning off the aluminum, the surface of the intermediate layer is made matte by an organic additive which, when subject to electrical discharge, burns with little or no residue. The matte surface of the intermediate layer also decreases the gloss or shine of the overall carrier since it will affect the surface characteristics of the aluminum layer thereover.

12 Claims, 1 Drawing Figure

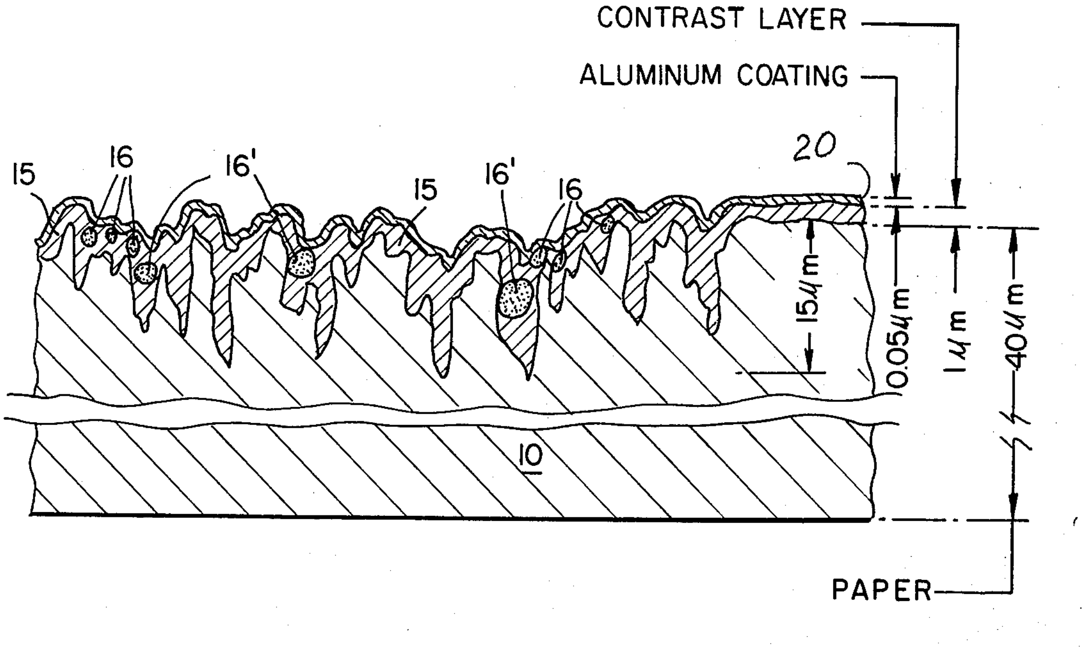
CONTRAST LAYER
ALUMINUM COATING
20
15
16
16'
15
16'
16
15μm
0.05μm
1μm
40μm
10
PAPER

RECORDING CARRIER FOR ELECTRICAL DISCHARGE RECORDING APPARATUS

Reference to related copending application: U.S. Ser. No. 951,363, filed Oct. 16, 1979, JUNG. U.S. Pat. Nos. 3,995,083 and 3,831,179, both assigned to the assignee of the present application.

The present invention relates to a recording medium, and more particularly to a recording medium which has a metallic surface which is burned off at selected locations, in accordance with information to be recorded, by passing the surface coated paper beneath contact electrodes.

BACKGROUND AND PRIOR ART

Recording carriers or recording media, typically having a paper base with a metallic coating thereover, have been described in the literature, see, for example U.S. Pat. No. 3,995,083, which discloses such a carrier using an intermediate layer which includes printing ink in order to increase the contrast of recorded information when the metal coating thereon, typically aluminum, is burned off. Using printing ink which can be colored, preferably black by using carbon black, provides good contrast and also has a certain surface roughness which reduces the sheen of the metallic aluminum coating on the paper.

It has also been proposed—see U.S. Pat. No. 3,831,179—to place an intermediate layer of a laquer, typically cellulose lacquer, as a contrast layer between a paper substrate or paper web and a metallic top coating, typically aluminum. The lacquer layer has particularly good blocking action with respect to migration of vapors between the substrate and the metallic coating and thus is eminently suitable to prevent corrosion of the aluminum coating, thereby increasing the shelf life of such recording media. The lacquer coating has some disadvantages, however, in that contrast of recorded information and surface sheen of the overall paper are not always satisfactory.

It has been proposed to increase the contrast, particularly when using printing ink as the intermediate layer, by adding carbon black as a contrast and matte surface producing agents to the ink. The quantity of carbon black which can be added to the ink is not unlimited, however, since carbon black is an electrical conductor and, if the percentage thereof becomes too great, for example in excess of about 15%, significant current can flow through the carbon black additives, resulting in undesired heating of the intermediate layer. Both lacquer and printing ink frequently are made on the basis of nitrocellulose, also known as gun cotton. During recording, an exothermal reaction may occur in which the intermediate layer is involved, destroying the recording carrier substrate in this region.

A frequently used additive to cause a matte surface is based on silicon oxide—commonly a suitable $SiO_x$ compound—which, however, causes difficulty in recording. During the recording process, the top layer is burned off; $SiO_x$ compounds will be affected similar to a sintering process, causing deposits on the electrodes which substantially decreases their useful life. The writing current may even be interrupted, causing an interruption in recording. Removal of this deposit by increasing the writing pressure is undesirable since it increases wear on the recording medium and further on the electrodes themselves.

THE INVENTION

It is an object to improve the contrast when recording on metallized, typically aluminized recording paper by means of electric writing electrodes, in which the metal coating is burned off, without degrading the electrodes, or using paper which may cause a hazard.

Briefly, the intermediate layer which may be a lacquer base or printing ink base has an additive therein which is a combustible organic matte-causing substance.

In accordance with a feature of the invention, the matte-causing substance is preferably a polystyrene or a polyethylene, added in particles having a particle size of between 0.1 $\mu$m and 10 $\mu$m, in the form of a granulate with essentially uniform granule size, or with granulates in which the sizes of the granules are different.

A record carrier of this type has the advantage that the matte surface of the intermediate layer will affect the metal coating thereover, that is, the matte surface will appear through the metal coating, which substantially increases the surface characteristics of the recording carrier regarding legibility thereof. Reflections and glare are substantially suppressed and, if present, are at low level. The organic, combustible matte-producing additives have the specific advantage over additives on the $SiO_x$ base that, upon recording, no or practically no adhering deposits will occur on the writing electrodes, and particularly sinter-type deposits are avoided. Interruption of the writing current, and consequent interruption of the writing track, is effectively prevented, since the combustible organic matte-causing additive is burned off upon recording, that is, burns due to the burn-out temperatures. No, or only very little residue will remain, and especially residues which adhere to the electrode are practically entirely eliminated. This permits recording with substantially less electrode pressure, greatly increasing the life of the electrodes, preventing damage to the recording carrier and avoiding undesired scatches or mechanical abrasions on the metallic surface.

Particularly preferred and suitable matte-causing additives are combustible organic materials, especially polystyrene and polyethylene. The granulate is preferably in the form of tiny balls or spheres, added to the intermediate layer of the recording medium. The combustion temperatures of these substances are below the temperatures which occur during the burn-out process of the metal layer upon recording, and practically no combustion residues will remain; whatever combustion residues due remain, do not undesirably affect the electrodes.

Drawings, illustrating a preferred example, wherein the single FIGURE is a highly schematic cross section, to a greatly enlarged scale, of a recording carrier on a paper base.

The carrier has a substrate of paper; it may, however, be other material, such as a plastic foil, for example Mylar, or it may be a fixed plate-like carrier, such as cardboard, a plastic sheet, printed circuit board, or the like. An intermediate contrast layer 15 is applied to the paper. The contrast layer may be lacquer, typically a cellulose-based lacquer, or it may be a printing ink. The contrast layer 15 can be applied in the form of multiple layer sections, one over the other, for example layer sections including both lacquer and ink, or lacquer coating sections supplied in sequential coating steps, to form sublayers above each other, which may again have one or more sublayer of ink coatings applied thereto. Regardless of the type of contrast layer 15 which is used, the layer has a combustible organic matte-causing additive contributed thereto, for example mixed therein. The surface of the intermediate contrast layer 15 thus will have a matte appearance.

Preferred matte-producing substances are polystyrene or polyethylene particles having particle sizes between 0.1 μm to 10 μm. The size of the granulate may vary, or may be uniform, and the shape is preferably spherical.

EXAMPLE 1

A paper substrate 10 of about 40 μm thickness has a lacquer coating applied thereto having a thickness of 1 μm; an aluminum coating of a thickness of 0.05 μm is then applied over the lacquer. The metallic recording layer is so thin that its surface follows practically exactly the surface of the intermediate contrast layer 15, in the example the surface of the lacquer layer. Thus, the surface of the aluminum coating 20 likewise will not be straight or smooth, as shown in the drawing (in which the layers are not shown to scale, or even to relative scale), but rather will follow the surface roughness of the intermediate contrast layer 15. Thus, the surface of the aluminum coating top layer 20 will have a matte appearance and mirror-type reflections are essentially and effectively suppressed. The FIGURE shows some of the granules 16 at the surface of the contrast layer, causing slight changes in the surface of the aluminum coating 20. It is to be understood that the drawing is highly schematic. The particle size of the additives 16 of course must be matched to the desired thickness of the contrast layer. The FIGURE shows the surface of the paper to a greatly enlarged and somewhat exaggerated scale. It is a schematic FIGURE since, in actuality, paper has a depth of valleys—causing surface roughness—which may extend to about 15 μm in 40 μm paper. These valleys can readily accept particles of the additives 16 which may have a particle size greater than the nominal thickness of the contrast layer as such. The contrast layer is applied, as is customary, by means of a roller or cylinder and a doctor blade; consequently, particles having a 1 μm diameter will not be found at a tip or peak of the paper but, rather, will be distributed towards valleys of the paper surface—see particles 16' in the FIGURE. The nominal thickness of the contrast layer, as given, is given determined by means of micrometer measurements as the difference of the overall thickness of paper covered with a contrast layer and the thickness of the paper after the contrast layer has been removed by dissolving it off the surface of the paper. This embedding of particles in the valleys produced by the inherent surface roughness of the paper itself permits the addition of particle sizes greater than the nominal thickness of the contrast layer itself.

Known lacquer coatings usually have a smooth surface since the pigment content usually is low. Inks, particularly gravure printing inks, can accept substantially higher proportions of pigmentation. It is customary to provide black pigmentation by addition of carbon black, which leads to a surface which has a much higher matte value, or looks much more matte than lacquer. There is a limit, however, to the improvement of the surface quality, with respect to matte appearance, when using ink as the intermediate layer due to the electrical conductivity thereof. In accordance with the present invention, a portion of the carbon black content of the intermediate layer is replaced by organic granules; the additional advantage obtains that the contrast characteristics are retained while the quality of the recording medium is substantially enhanced. Undesired heating due to current flow within the contrast layer is effectively prevented since the organic plastic combustible particles are, effectively, electrical insulators. Exothermal reactions occurring in the intermediate layer upon burn-out of the aluminum coating 20 thus are effectively prevented.

EXAMPLE 2

A paper substrate of about 40 μm thickness has a contrast layer of printing ink applied thereto by gravure printing. The thickness of the contrast layer is 4 μm. The printing ink is nitro-printing-ink having 5% carbon black and 3% of granules of 1 μm diameter, of polypropylene added thereto (percentages by weight). The top coating 20 was aluminum, of about 0.05 μm thickness.

Besides the preferred combustible organic compounds, polystyrene and polyethylene, other organic compounds may also be used, such as polypropylene.

Various changes and modifications may be made within the scope of the inventive concept.

I claim:

1. Recording carrier for recording instruments in which, during recording, a metal coating is burned off, having a substrate (10);

a metal coating (20);

and an intermediate contrast layer (15) between the substrate (10) and the metal coating, said intermediate contrast layer comprising at least one of: a lacquer; a printing ink, and wherein, in accordance with the invention, the intermediate contrast layer includes an additive (16) comprising an organic matte-surface producing granular substance which is combustible upon burning-off the metal coating during recording.

2. Carrier according to claim 1, wherein the combustible organic matte-producing substance comprises polystyrene.

3. Carrier according to claim 1, wherein the combustible organic matte-producing substance comprises polyethylene.

4. Carrier according to claim 1, wherein the intermediate contrast layer comprises a cellulose-base lacquer, and the combustible organic matte-producing substance is present in form of a granulate of a particle size less than the thickness of said layer in the quantity of ≦20% (by weight).

5. Carrier according to claim 1, wherein the metallic coating (20) comprises aluminum and has a thickness in the order of 0.05 μm.

6. Carrier according to claim 1, wherein the combustible organic matte-producing substance comprises polypropylene.

7. Carrier according to claim 1, wherein the granular organic substance is electrically insulating.

8. Carrier according to claim 1, wherein the intermediate contrast layer comprises printing ink, and the combustible organic matte-producing substance is present in form of a granulate of a particle size less than the thickness of said layer in the quantity of ≦20% (by weight).

9. Carrier according to claim 8, wherein the printing ink includes carbon black up to ≦30% by weight, and the granulate is present in up to ≦20% by weight.

10. Carrier according to claim 1, wherein the matte-producing substance is a granulate having a particle size between 0.1 μm and 10 μm.

11. Carrier according to claim 10, wherein the particle size is between 0.1 μm and 1 μm.

12. Carrier according to claim 10, wherein the particle size of the granulate is not more than 100% of the thickness of the intermediate contrast layer (15).

* * * * *